United States Patent
Oh et al.

(10) Patent No.: US 11,858,460 B2
(45) Date of Patent: Jan. 2, 2024

(54) DEVICE AND METHOD FOR CONTROLLING USER AUTHENTICATION TRANSMISSION

(71) Applicants: Hyundai Motor Company, Seoul (KR); Kia Corporation, Seoul (KR)

(72) Inventors: Da Ye Oh, Seoul (KR); Ki Suk Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 121 days.

(21) Appl. No.: 17/489,186

(22) Filed: Sep. 29, 2021

(65) Prior Publication Data

US 2022/0144214 A1    May 12, 2022

(30) Foreign Application Priority Data

Nov. 11, 2020 (KR) .......... 10-2020-0150473

(51) Int. Cl.
*B60R 25/25* (2013.01)
*G06F 21/32* (2013.01)
*B60R 25/24* (2013.01)

(52) U.S. Cl.
CPC .......... *B60R 25/252* (2013.01); *B60R 25/241* (2013.01); *B60R 25/255* (2013.01); *G06F 21/32* (2013.01); *B60Y 2200/91* (2013.01)

(58) Field of Classification Search
CPC ... B60R 25/252; B60R 25/241; B60R 25/255; B60Y 2200/91; G06F 21/32
USPC ...................................................... 340/5.53
See application file for complete search history.

(56) References Cited

U.S. PATENT DOCUMENTS

| | | | |
|---|---|---|---|
| 6,927,671 B2* | 8/2005 | DeBono | B60R 25/257 340/5.83 |
| 10,589,721 B1* | 3/2020 | Kim | G07C 9/00174 |
| 2018/0234797 A1* | 8/2018 | Ledvina | H04W 4/023 |
| 2018/0359611 A1* | 12/2018 | McNabb | H04W 36/03 |
| 2019/0366918 A1* | 12/2019 | Zhou | B60Q 1/30 |

\* cited by examiner

*Primary Examiner* — Kam Wan Ma
(74) *Attorney, Agent, or Firm* — Slater Matsil, LLP

(57) ABSTRACT

An embodiment device for controlling a user authentication transmission includes a user authentication device configured to perform user authentication of a user authorized to operate a vehicle and a controller disposed in the vehicle. The controller is configured to unlock a transmission of the vehicle based on a result of the user authentication. An embodiment method for controlling a user authentication transmission includes performing user authentication of a user authorized to operate a vehicle and unlocking a transmission of the vehicle based on a result of the user authentication.

20 Claims, 7 Drawing Sheets

DEVICE AND METHOD FOR CONTROLLING USER AUTHENTICATION TRANSMISSION

CROSS-REFERENCE TO RELATED APPLICATIONS

This application claims the benefit of Korean Patent Application No. 10-2020-0150473, filed in the Korean Intellectual Property Office on Nov. 11, 2020, which application is hereby incorporated herein by reference.

TECHNICAL FIELD

The present disclosure relates to a device and a method for controlling a user authentication transmission.

BACKGROUND

A transmission of a vehicle is a device that changes a speed of a moving engine to a desired speed. Gears of different sizes are engaged to each other to adjust the speed and a force of the engine. The transmissions of the vehicle include an automatic transmission that automatically shifts based on the speed and a manual transmission in which a driver must directly adjust the shift.

When a gear stage of the transmission is adjusted to a P-stage (parking stage), the vehicle comes into a state in which the vehicle does not move as the gear is engaged. Therefore, when the gear stage of the transmission is not changed from the P-stage to another gear stage, the vehicle is in a state in which the vehicle is not able to be operated.

There may be a situation in which the driver has been away from the vehicle for a while in the state in which the gear state of the vehicle is left as the P-stage. For example, a situation such as a valet parking, a chauffeur service, or the like may be such a situation. When an outsider intrudes into the vehicle in the situation in which the driver has been away from the vehicle for a while, there is a risk of theft because the outsider is able to escape while driving the vehicle.

When the transmission has a lock function and the lock is released only when a user authenticates, the risk of theft as described above may be prevented.

SUMMARY

The present disclosure relates to a device and a method for controlling a user authentication transmission. Particular embodiments relate to a device and a method for unlocking a transmission of a vehicle based on user authentication.

Embodiments of the present disclosure can solve problems occurring in the prior art while advantages achieved by the prior art are maintained intact.

An embodiment of the present disclosure provides a device and a method for controlling a user authentication transmission.

Another embodiment of the present disclosure provides a device and a method for controlling a user authentication transmission that control a transmission of a vehicle to be in a locked state based on departure of a user and unlock the transmission of the vehicle through user authentication information determined based on at least one of a face, an iris, and/or a fingerprint of the user to enhance security of the vehicle.

Another embodiment of the present disclosure provides a device and a method for controlling a user authentication transmission that control a transmission to be locked or unlocked to be suitable for a situation in consideration of a theft occurred situation, a valet parking situation, and a chauffeur service situation, thereby enhancing security of a vehicle.

Another embodiment of the present disclosure provides a device and a method for controlling a user authentication transmission that may prevent a theft situation by outputting an alarm when manipulation of a transmission in a locked state is attempted.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a device for controlling a user authentication transmission includes a user authentication device that performs user authentication, and a controller disposed in a vehicle, wherein the controller unlocks a transmission of the vehicle based on the result of the user authentication.

In one implementation, the controller may determine whether a user has departed the vehicle, and control the transmission to be in a locked state based on the departure of the user.

In one implementation, the device may further include a key detection device disposed in the vehicle, wherein the key detection device detects a key of the vehicle, and the controller may determine whether the user has departed the vehicle based on at least one of a gear stage of the transmission, whether the vehicle is determined to be in a stopped state, whether a door of a driver's seat of the vehicle is opened or closed, and/or the result of detecting the key.

In one implementation, the controller may detect the key through the key detection device when the door is opened and then closed in a state in which the gear stage of the transmission is a P-stage and the vehicle is determined to be in the stopped state, and determine that the user has departed the vehicle when the key is not detected inside the vehicle to control the transmission to be in the locked state.

In one implementation, the user authentication device may perform the user authentication when the controller determines that the user has departed the vehicle, and the controller may unlock the transmission when the user authentication is completed.

In one implementation, the controller may output an alarm when manipulation of the transmission in a locked state is attempted in a state in which the user authentication is not completed.

In one implementation, the vehicle may include a vehicle having a motor driven through electricity, and the controller may control to maintain an electric vehicle (EV) ready state in which travel of the vehicle is possible even when the key of the vehicle is not detected inside the vehicle when it is determined that the user has departed the vehicle and the user authentication is completed through the user authentication device within a predetermined time.

In one implementation, the user authentication may include at least one of face authentication, iris authentication, and/or fingerprint authentication.

In one implementation, the controller may control the transmission to be in the locked state when a digital key or a card key is not detected inside the vehicle through the key detection device within a predetermined time when information indicating that the user has called a chauffeur service is obtained through a communication terminal of the user.

In one implementation, the vehicle may include a vehicle having a motor driven through electricity, and the controller may delete a condition in which the key of the vehicle is not detected inside the vehicle from a specific condition of terminating an electric vehicle (EV) ready state, a travelable state of the vehicle, in response to the call of the chauffeur service.

According to another embodiment of the present disclosure, a method for controlling a user authentication transmission includes performing user authentication, and unlocking a transmission of a vehicle based on the result of the user authentication.

In one implementation, the method may further include determining whether a user has departed the vehicle, and controlling the transmission to be in a locked state based on whether the user has departed.

In one implementation, the method may further include detecting a key of the vehicle, and the determining of whether the user has departed the vehicle may include determining whether the user has departed the vehicle based on at least one of a gear stage of the transmission, whether the vehicle is determined to be in a stopped state, whether a door of a driver's seat of the vehicle is opened or closed, and/or the result of detecting the key.

In one implementation, the detecting of the key of the vehicle may include detecting the key when the door is opened and then closed in a state in which the gear stage of the transmission is a P-stage and the vehicle is determined to be in the stopped state, and the controlling of the transmission to be in the locked state based on whether the user has departed may include determining that the user has departed the vehicle when the key is not detected inside the vehicle to control the transmission to be in the locked state.

In one implementation, the performing of the user authentication may include performing the user authentication when it is determined that the user has departed the vehicle, and the unlocking of the transmission of the vehicle based on the result of the user authentication may include unlocking the transmission when the user authentication is completed.

In one implementation, the method may further include outputting an alarm when manipulation of the transmission in a locked state is attempted in a state in which the user authentication is not completed.

In one implementation, the vehicle may include a vehicle having a motor driven through electricity, and the method may further include controlling to maintain an electric vehicle (EV) ready state in which travel of the vehicle is possible even when the key of the vehicle is not detected inside the vehicle when it is determined that the user has departed the vehicle and the user authentication is completed within a predetermined time.

In one implementation, the user authentication may include at least one of face authentication, iris authentication, and/or fingerprint authentication.

In one implementation, the detecting of the key of the vehicle may include detecting a digital key or a card key when information indicating that the user has called a chauffeur service is obtained through a communication terminal of the user, and the controlling of the transmission to be in the locked state based on whether the user has departed may include controlling the transmission to be in the locked state when the digital key or the card key is not detected inside the vehicle within a predetermined time.

In one implementation, the vehicle may include a vehicle having a motor driven through electricity, and the method may further include deleting a condition in which the key of the vehicle is not detected inside the vehicle from a specific condition of terminating an electric vehicle (EV) ready state, a travelable state of the vehicle, in response to the call of the chauffeur service.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
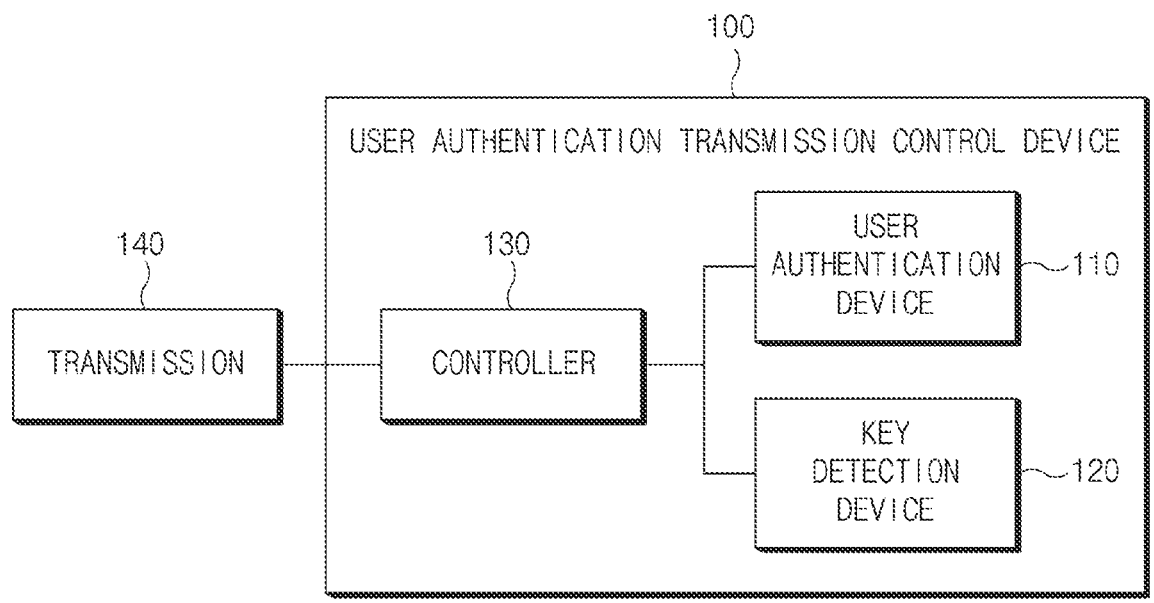
FIG. 1 is a block diagram of a user authentication transmission control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 7.

FIG. 1 is a block diagram of a user authentication transmission control device according to an embodiment of the present disclosure.

Referring to FIG. 1, a user authentication transmission control device 100 may include a user authentication device 110, a key detection device 120, and a controller 130.

As an example, the user authentication transmission control device 100 may be formed integrally with a vehicle or may be implemented in a form installed in/attached to the vehicle as a separate component from the vehicle. A portion of the device 100 may be implemented integrally with the vehicle, and the remaining portion thereof may be implemented in a form installed in/attached to the vehicle as a separate component from the vehicle.

The user authentication device 110 may perform user authentication.

As an example, the user authentication device 110 may be disposed in the vehicle to perform the user authentication, or may perform the user authentication in a manner of receiving information on the user authentication through a smartphone or the like of a user.

As an example, the user authentication device 110 may perform the user authentication through a face, an iris, and/or a fingerprint of the user.

As an example, the user authentication device no may include at least one of a face recognition module capable of recognizing the face, an iris recognition module capable of recognizing the iris, and/or a fingerprint recognition module capable of recognizing the fingerprint.

As an example, the user authentication device 110 may be implemented by being directly or indirectly connected to the controller 130 through wireless or wired communication.

As an example, the user authentication device 110 may transmit the result of the performed user authentication to the controller 130.

The key detection device 120 may be disposed in the vehicle to detect a key of the vehicle.

As an example, the vehicle key may include a smart key.

As an example, the key detection device 120 may include a smart key system, and may detect the smart key through communication with the smart key.

As an example, the key detection device 120 may include a communication module using a scheme such as a Wi-Fi, a Bluetooth, a Zigbee, an ultra-wide band (UWB) communication, a near field communication (NFC), and the like, and may communicate with the smart key through the communication module to detect the smart key.

As an example, the key detection device 120 may be implemented by being directly or indirectly connected to the controller 130 through wireless or wired communication.

As an example, the key detection device 120 may transmit the result of detecting the key to the controller 130.

The controller 130 may be disposed in the vehicle and unlock a transmission of the vehicle based on the result of the user authentication.

As an example, the controller 130 may be implemented in connection with the user authentication device 110, the key detection device 120, and a transmission 140 of the vehicle.

As an example, the controller 130 may determine whether the user has departed from the vehicle, and control the transmission to be in a locked state when it is determined that the user has departed from the vehicle.

Specifically, the controller 130 may determine whether the user has departed from the vehicle based on at least one of a gear stage of the transmission, whether the vehicle is determined to be in a stopped state, whether a door of a driver's seat of the vehicle is opened or closed, and/or the result of detecting the key.

As an example, the controller 130 may receive a speed of the vehicle from a vehicle speed sensor to determine whether the vehicle is determined to be in the stopped state. In addition, when the speed of the vehicle does not exceed a reference speed, the controller 130 may determine that the vehicle is in the stopped state.

As an example, the controller 130 may receive information on whether the door is opened or closed from a door sensor to determine whether the door of the driver's seat of the vehicle is opened or closed.

As an example, the controller 130 may determine one of an anti-theft situation, a valet parking situation, and a chauffeur service situation based on the gear stage of the transmission, whether the vehicle is determined to be in the stopped state, whether the door of the driver's seat of the vehicle is opened or closed, the result of detecting the key, whether the user has called the chauffeur service with the smartphone, and the like to control the vehicle to be locked or unlocked to be suitable for each situation. This will be described in detail in FIGS. 4 to 7.

The transmission 140 is a device that is located between an engine and a wheel of the vehicle and controls the speed and a driving force, which may be implemented by being connected to the controller 130.

As an example, the transmission 140 may be controlled to be locked or unlocked by the controller 130.

Figure 2:
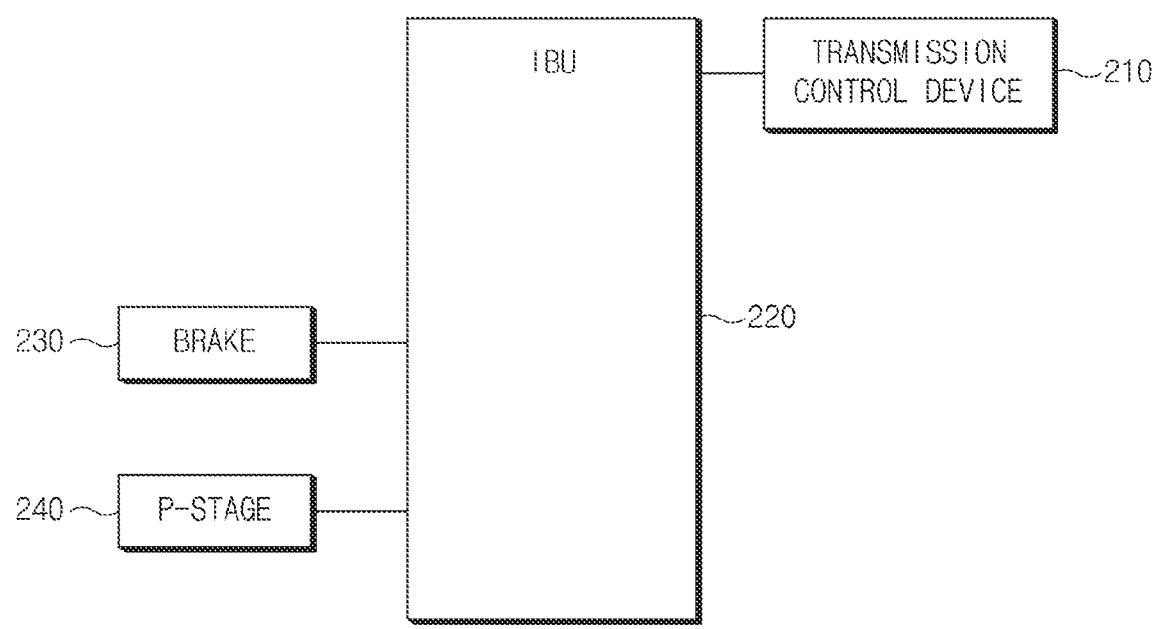
FIG. 2 is a diagram illustrating an existing transmission control device.

FIG. 2 is a diagram illustrating an existing transmission control device.

Referring to FIG. 2, an existing transmission control device 210 may be directly or indirectly connected to an integrated body unit (IBU) 220 of the vehicle through wireless or wired communication.

The IBU 220 may be directly or indirectly connected to a brake 230 of the vehicle and a shift lever of the vehicle through wireless or wired communication.

The IBU 220 may identify information on whether the brake 230 of the vehicle is in a state of being pressed and on whether the gear stage of the vehicle corresponds to a P-stage 240.

The existing transmission control device 210 may receive the information on whether the brake 230 of the vehicle is in the state of being pressed and on whether the gear stage of the vehicle corresponds to the P-stage 240 from the IBU 220 of the vehicle.

The existing transmission control device 210 may control the transmission based on whether the brake 230 of the vehicle is in the state of being pressed and whether the gear stage of the vehicle is the P-stage 240. In this case, the user authentication is not considered.

When using the existing transmission control device 210, there is a possibility that the vehicle is driven or stolen by someone other than the driver because there is no user authentication process in the process of unlocking the transmission when the driver has departed from the vehicle. Therefore, when a user authentication function is added to the transmission control device, security for the travel of the vehicle may be strengthened.

Figure 3:
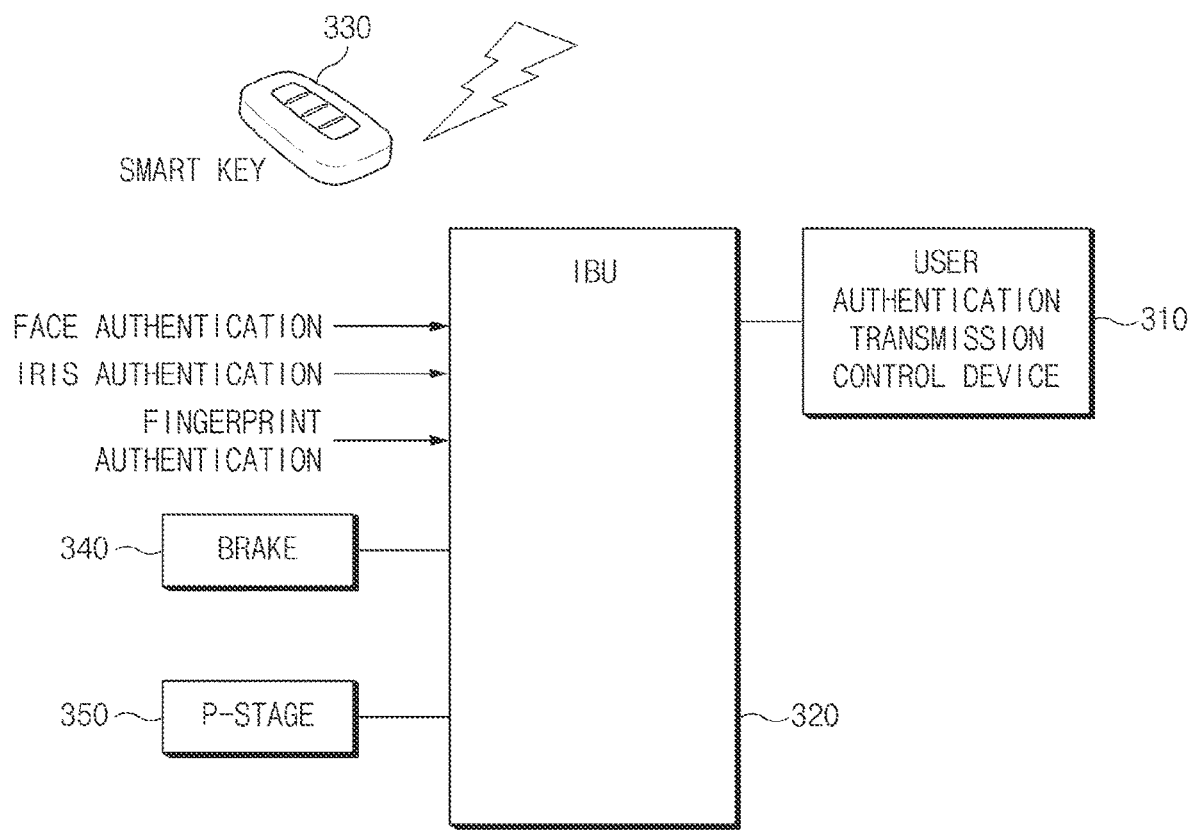
FIG. 3 is a diagram illustrating a user authentication transmission control device that performs key authentication and user authentication according to an embodiment of the present disclosure.

FIG. 3 is a diagram illustrating a user authentication transmission control device that performs key authentication and user authentication according to an embodiment of the present disclosure.

A user authentication transmission control device 310 may be directly or indirectly connected to an IBU 320 of the vehicle through wireless or wired communication.

The IBU 320 may include an integrated body controller of the vehicle in which electronic control units (ECUs) of the vehicle such as a body control module (BCM), a smart key system, a tire pressure monitoring system (TPMS), a parking assist system (PAS), and the like are integrated.

The IBU 320 may be directly or indirectly connected to a brake 340 of the vehicle and the shift lever of the vehicle through wireless or wired communication.

The IBU 320 may identify information on whether the brake 340 of the vehicle is in a state of being pressed and on whether the gear stage of the vehicle corresponds to a P-stage 350.

The IBU 320 may communicate with a smart key 330 of the vehicle to obtain information obtained by detecting the smart key 330.

The IBU 320 may obtain information obtained by performing the user authentication including at least one of face authentication, iris authentication, and/or fingerprint authentication.

The user authentication transmission control device 310 may receive the information on whether the brake 340 of the vehicle is in the state of being pressed and on whether the gear stage of the vehicle corresponds to the P-stage 350 from the IBU 320 of the vehicle.

The user authentication transmission control device 310 may receive the information on the result of detecting the smart key 330 from the IBU 320.

The user authentication transmission control device 310 may receive the information obtained by performing the user authentication including at least one of the face authentication, the iris authentication, and/or the fingerprint authentication from the IBU 320.

The user authentication transmission control device 310 may control the transmission to be locked or unlocked based on the information received from the IBU 320. Thus, theft of the vehicle may be prevented.

Figure 4:
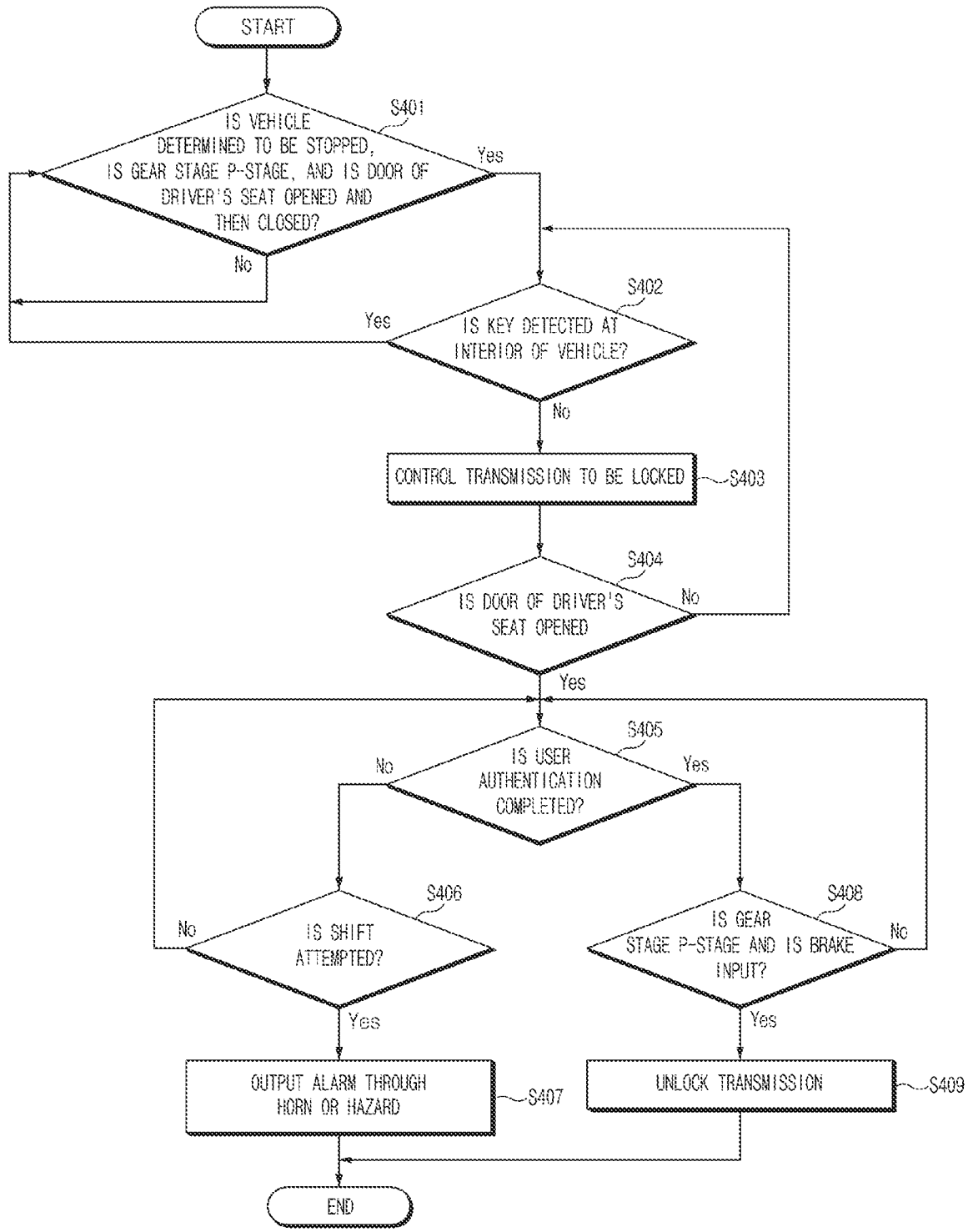
FIG. 4 is a flowchart illustrating a user authentication transmission control method in an anti-theft situation according to an embodiment of the present disclosure.

FIG. 4 is a flowchart illustrating a user authentication transmission control method in an anti-theft situation according to an embodiment of the present disclosure.

The user authentication transmission control device 100 may determine whether the vehicle is stopped, whether the gear stage is the P-stage, and whether the door of the driver's seat is opened and then closed (S401).

As an example, when the speed of the vehicle does not exceed 3 km/h, the user authentication transmission control device 100 may determine that the vehicle has stopped.

In this connection, the numerical value of 3 km/h is a value arbitrarily determined to give an example. In reality, a different numerical value may be used. This numerical value may be set as a speed low enough to determine that the vehicle has stopped.

As an example, the user authentication transmission control device 100 may communicate with the shift lever of the vehicle to receive information on a state of the gear stage of the vehicle. In addition, the user authentication transmission control device 100 may determine whether the received state of the gear stage of the vehicle corresponds to the P-stage.

As an example, the user authentication transmission control device 100 may receive the information on whether the door of the driver's seat is opened or closed from the door sensor that senses whether the door of the driver's seat is opened or closed. In addition, the user authentication transmission control device 100 may determine whether the door of the driver's seat is opened and then closed based on whether the door of the driver's seat is opened or closed, which is received. When the door of the driver's seat is opened and then closed, the user authentication transmission control device 100 may determine that the driver has departed from the vehicle.

When it is determined that the vehicle is not stopped, the gear stage is not the P-stage, or the door of the driver's seat is not opened and then closed, the user authentication transmission control device 100 may repeat the process of determining whether the vehicle is stopped, whether the gear stage is the P-stage, and whether the door of the driver's seat is opened and then closed of S401 again.

As an example, when it is determined that the vehicle is not stopped, the gear stage is not the P-stage, or the door of the driver's seat is not opened and then closed, because the vehicle is in a state in which the driver is present inside the vehicle, the user authentication transmission control device 100 may determine that the lock of the transmission is not required, and repeat the process of S401 without performing a next process.

When it is determined that the vehicle is stopped, the gear stage is the P-stage, and the door of the driver's seat is opened and then closed, the user authentication transmission control device 100 may determine whether the key is detected at an interior of the vehicle (S402).

As an example, the user authentication transmission control device 100 may determine a location of the smart key through wireless communication with the smart key to determine whether the smart key is detected at a location determined to be the interior of the vehicle.

When the key is detected at the interior of the vehicle, the user authentication transmission control device 100 may repeat the process of determining whether the vehicle is stopped, whether the gear stage is the P-stage, and whether the door of the driver's seat is opened and then closed of S401 again.

When the key is detected at the interior of the vehicle, the driver holding the smart key may not have departed from the vehicle. In this case, the user authentication transmission control device 100 may repeat the process of S401 without controlling the transmission to be locked, because the driver may attempt to control the transmission again.

The user authentication transmission control device 100 may control the transmission to be locked when the key is not detected at the interior of the vehicle (S403).

When the smart key is not detected inside the vehicle, the user authentication transmission control device 100 may determine that the driver holding the smart key has departed from the vehicle. In this case, when the user authentication is not performed, the user authentication transmission control device 100 may lock the transmission to block a situation in which a third party controls the transmission, and activate an anti-theft mode for preventing theft of the vehicle.

As an example, the user authentication transmission control device 100 may deactivate the anti-theft mode when the key is detected at the interior of the vehicle or when the user authentication is completed.

As an example, the user authentication transmission control device 100 may control the transmission to be locked through the IBU capable of controlling the transmission of the vehicle to be locked or unlocked.

The user authentication transmission control device 100 may determine whether the door of the driver's seat of the vehicle is opened after controlling the transmission to be locked (S404).

As an example, the user authentication transmission control device 100 may determine whether the door of the driver's seat is opened through the door sensor of the vehicle.

When it is identified that the door of the driver's seat of the vehicle is not opened, the user authentication transmission control device 100 may repeat the process of detecting the key at the interior of the vehicle of S402 again.

As an example, when it is identified that the door of the driver's seat is not opened, the user authentication transmission control device 100 may identify that a current situation is a situation in which the driver or the third party does not exist in the vehicle. In this case, the user authentication transmission control device 100 may maintain the locked state of the transmission without attempting the user authentication.

When it is identified that the door of the driver's seat of the vehicle is opened, the user authentication transmission control device 100 may determine whether the user authentication is completed (S405).

As an example, the user authentication transmission control device 100 may receive the result of the user authentication including at least one of the face authentication, the iris authentication, and/or the fingerprint authentication through the user authentication device 110 to determine whether the user authentication is completed.

As an example, when it is identified that the door of the driver's seat is open, the user authentication transmission control device 100 may identify that the driver or the third party is in the vehicle. In this case, the user authentication transmission control device 100 may attempt the user authentication, and unlock the transmission or output an alarm when a shift is attempted in the locked state of the transmission based on the result of the user authentication.

When it is determined that the user authentication is not completed, the user authentication transmission control device 100 may determine whether the shift of the transmission is attempted (S406).

As an example, the user authentication transmission control device 100 may be connected to the shift lever, and determine whether the shift is attempted through the shift lever.

The user authentication transmission control device 100 may output the alarm through a horn or a hazard when it is identified that the shift of the transmission is attempted (S407).

As an example, when the shift of the transmission is attempted, the user authentication transmission control device 100 may determine that the intruder of the vehicle has attempted the shift of the transmission, and output the alarm through the horn or the hazard to notify surroundings of theft situation or to rattle the intruder, thereby preventing theft of the vehicle.

As an example, when the brake is input and a release button is pressed, the user authentication transmission control device 100 may determine that the shift of the transmission has been attempted, and may output the alarm through the horn or the hazard.

When it is determined that the shift of the transmission has not been attempted, the user authentication transmission control device 100 may repeat the process of attempting the user authentication of S405 again.

As an example, when the shift of the transmission has not been attempted, there is a possibility that an occupant may additionally complete the user authentication, so that the user authentication transmission control device 100 may repeat the process of determining whether the user authentication is completed to determine whether the occupant of the vehicle is the driver or the intruder.

When it is identified that the user authentication is completed, the user authentication transmission control device 100 may determine whether the gear stage of the vehicle is the P-stage and the brake of the vehicle is input (S408).

As an example, the user authentication transmission control device 100 may determine whether the gear stage is the P-stage and the brake is input by being directly connected to the shift lever and the brake of the vehicle or through the IBU.

As an example, when the user authentication is completed, the user authentication transmission control device 100 may determine that the driver has returned to the vehicle or the driver has agreed to the transmission control of the third party, and may determine whether the gear stage is the P-stage and the brake is input to unlock the transmission.

When it is identified that the gear stage of the vehicle is not the P-stage, or the brake of the vehicle is not input, the user authentication transmission control device 100 may repeat the process of attempting the user authentication of S405 again.

When it is identified that the gear stage of the vehicle is the P-stage and the brake of the vehicle is input, the user authentication transmission control device 100 may control the transmission of the vehicle to be unlocked (S409).

As an example, the user authentication transmission control device 100 may unlock the transmission through the IBU capable of controlling the transmission of the vehicle to be unlocked.

Figure 5:
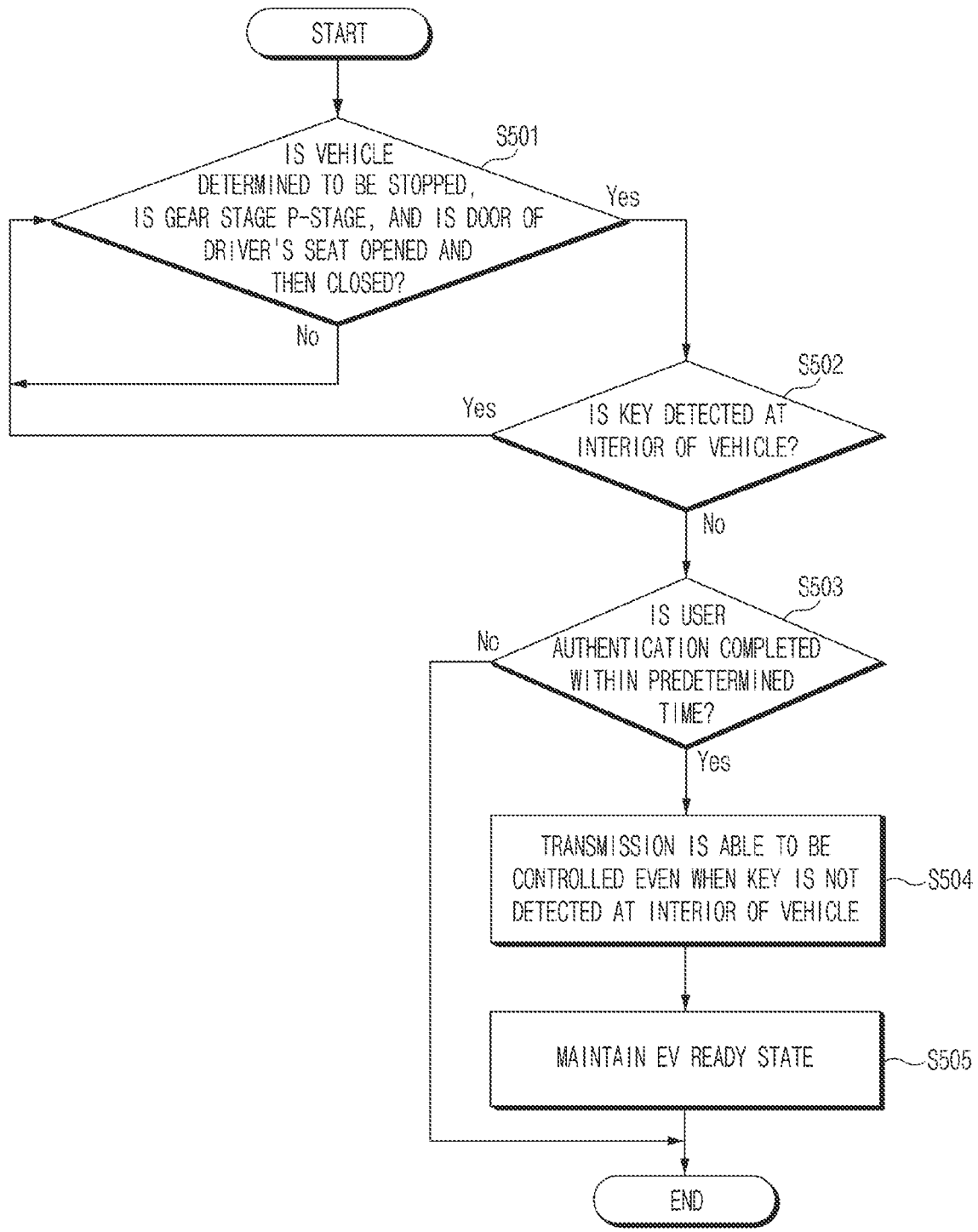
FIG. 5 is a flowchart illustrating a user authentication transmission control method in a valet parking situation according to an embodiment of the present disclosure.

FIG. 5 is a flowchart illustrating a user authentication transmission control method in a valet parking situation according to an embodiment of the present disclosure.

When it is identified that the key is detected at the interior of the vehicle, the user authentication transmission control device 100 may repeat a process of determining whether the vehicle is stopped, whether the gear stage is the P-stage, and whether the door of the driver's seat is opened and then closed of S501 again.

The process in which the user authentication transmission control device 100 determines whether the vehicle is stopped, whether the gear stage is the P-stage, and whether the door of the driver's seat is opened and then closed of S501 and a process in which the user authentication transmission control device 100 determines whether the key is detected at the interior of the vehicle of S502 are respectively the same as S401 and S402 described through FIG. 4, so that descriptions of S501 and S502 will be replaced by the descriptions of S401 and S402.

When it is identified that the key is not detected at the interior of the vehicle, the user authentication transmission control device 100 may determine whether the user authentication is completed within a predetermined time (S503).

As an example, the user authentication transmission control device 100 may receive the result of the user authentication including at least one of the face authentication, the iris authentication, and/or the fingerprint authentication through the user authentication device 110.

When it is identified that the user authentication is completed within the predetermined time, the user authentication transmission control device 100 may unlock the transmission such that the user is able to control the transmission even when the key is not detected at the interior of the vehicle (S504).

As an example, when the user authentication is completed within the predetermined time, a situation such as the valet parking where the driver allows the third party to control the transmission may be assumed, so that the user authentication transmission control device 100 may not activate the anti-theft mode, but activate a valet parking mode to unlock the transmission such that the transmission control is possible.

As an example, even when the key is detected outside the vehicle without being detected at the interior of the vehicle, when it is identified that the user authentication is completed within the predetermined time, the user authentication transmission control device 100 may unlock the transmission such that the user is able to control the transmission.

As an example, when the user authentication is completed within the predetermined time, the user authentication transmission control device 100 may maintain the state of the transmission capable of being controlled by the user as it is when the transmission was not in the locked state, and unlock the transmission to change the state of the transmission to the state capable of being controlled by the user when the transmission was in the locked state.

The user authentication transmission control device 100 may control the transmission to be unlocked such that the user is able to control the transmission, and then control the vehicle to maintain a travelable EV ready state (S505).

According to an existing technology, a vehicle including a vehicle whose motor is driven through electricity, such as an electric vehicle or a hydrogen vehicle, may automatically change the EV ready state of the vehicle to a power ON state when it is determined that the driver has departed.

Specifically, when the driver is in a non-seated state, the door of the vehicle is opened, the speed of the vehicle is low enough to determine that the vehicle has stopped, and the gear stage of the vehicle is P-stage, the vehicle according to the existing technology may determine that the driver of the vehicle has departed and automatically change the EV ready state of the vehicle to the power ON state.

Alternatively, when the door of the vehicle is opened and then closed, a FOB key or smart key is not detected at the interior of the vehicle, and the gear stage of the vehicle is the P-stage, the vehicle according to the existing technology may determine that the driver of the vehicle has departed and automatically change the EV ready state of the vehicle to the power ON state.

As an example, even when a condition for the vehicle according to the existing technology to determine that the driver has departed is satisfied, when the user authentication is completed within the predetermined time, the user authentication transmission control device 100 may control the vehicle to maintain an original state without changing the EV ready state of the vehicle to the power ON state.

Although not shown, the user authentication transmission control device 100 may deactivate the valet parking mode when the power is changed from ON to OFF in the valet parking mode.

Figure 6:
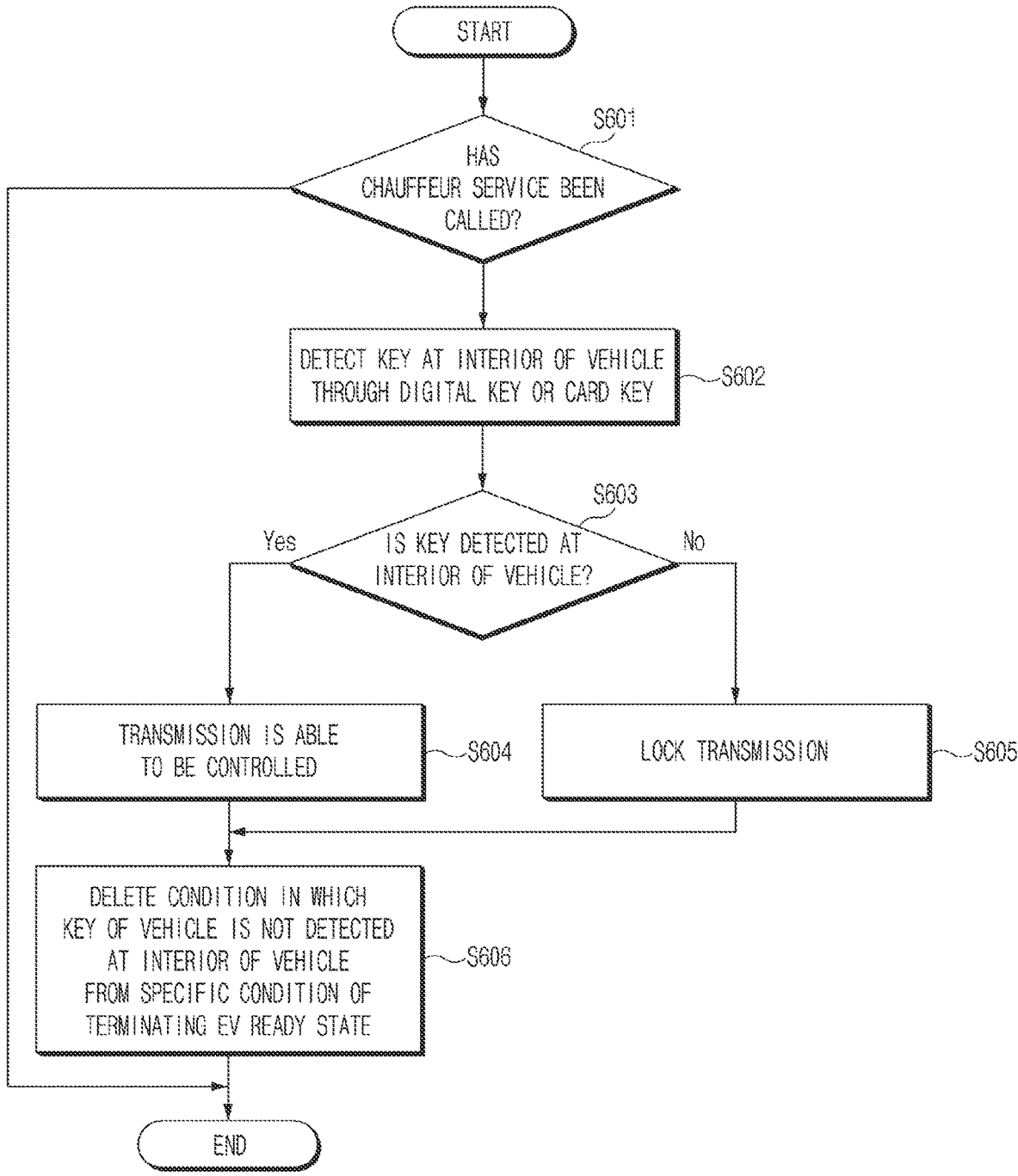
FIG. 6 is a flowchart illustrating a user authentication transmission control method in a chauffeur service situation according to an embodiment of the present disclosure.

FIG. 6 is a flowchart illustrating a user authentication transmission control method in a chauffeur service situation according to an embodiment of the present disclosure.

The user authentication transmission control device 100 may determine whether the chauffeur service has been called (S601).

As an example, the user authentication transmission control device 100 may determine whether the chauffeur service has been called through information on whether the user has called the chauffeur service through a smartphone application.

When it is identified that the chauffeur service has been called, the user authentication transmission control device 100 may attempt to detect the key at the interior of the vehicle through a digital key or a card key (S602).

As an example, the user authentication transmission control device 100 may attempt to detect the key at the interior of the vehicle through the NFC communication using the digital key or the card key of the user.

The digital key may include a key issued from a server through the smartphone of the user and unlocking the vehicle by tagging through the NFC communication with the smartphone that received the issued key.

The card key may include a key in a form of a card that unlocks the vehicle by tagging through the NFC communication, which is issued to enable the user to unlock the vehicle in a digital key system in a case in which the smartphone is lost or the like.

As an example, the digital key may maintain a state capable of detecting the interior key through the NFC communication for 30 seconds after the smartphone of the user is unlocked.

In this connection, the numerical value of 30 seconds is a value arbitrarily set for illustration. In reality, a different numerical value may be set.

After attempting to detect the key at the interior of the vehicle through the digital key or the card key, the user authentication transmission control device 100 may determine whether the key is detected at the interior of the vehicle (S603).

When it is identified that the key is detected at the interior of the vehicle, the user authentication transmission control device 100 may unlock the transmission such that the user is able to control the transmission (S604).

As an example, when the detection of the digital key or the card key through the NFC communication is identified after the chauffeur service is called, the user authentication transmission control device 100 may not activate the anti-theft mode, but activate the chauffeur service mode, and unlock the transmission to enable the transmission control.

As an example, when the user authentication is completed within the predetermined time, the user authentication transmission control device 100 may maintain the state of the transmission capable of being controlled by the user as it is when the transmission was not in the locked state, and unlock the transmission to change the state of the transmission to the state capable of being controlled by the user when the transmission was in the locked state.

The user authentication transmission control device 100 may delete a condition in which the key of the vehicle is not detected at the interior of the vehicle from a specific condition of terminating the EV ready state after controlling the transmission to be unlocked such that the user is able to control the transmission (S606).

When the condition in which the door of the vehicle is opened and then closed, the FOB key or the smart key is not detected at the interior of the vehicle, and the gear stage of the vehicle is the P-stage is satisfied, the vehicle according to the existing technology may determine that the driver of the vehicle has departed, terminate the EV ready state of the vehicle, and automatically change the state of the vehicle to the power ON state.

As an example, when a condition in which the door of the vehicle is opened and then closed and the gear stage of the vehicle is the P-stage is satisfied as the condition in which the FOB key or the smart key is detected at the interior of the vehicle is deleted, the user authentication transmission control device 100 may determine that the driver of the vehicle has departed, terminate the EV ready state of the vehicle, and automatically change to the state of the vehicle to the power ON state.

When it is identified that the key is not detected at the interior of the vehicle, the user authentication transmission control device 100 may control the transmission to be locked (S605).

As an example, when the key is not detected at the interior of the vehicle, the user authentication transmission control device 100 may assume a situation in which the user has called the chauffeur service, but the user has not boarded the vehicle. In this case, the user authentication transmission control device 100 may control the transmission to be locked to prevent theft of the vehicle, and activate the anti-theft mode.

The user authentication transmission control device 100 may delete the condition in which the key of the vehicle is not detected at the interior of the vehicle from the specific condition of terminating the EV ready state after controlling the transmission to be unlocked such that the user is able to control the transmission (S606).

Although not shown, the user authentication transmission control device 100 may deactivate the chauffeur service mode when the power is changed from ON to OFF in the chauffeur service mode.

Figure 7:
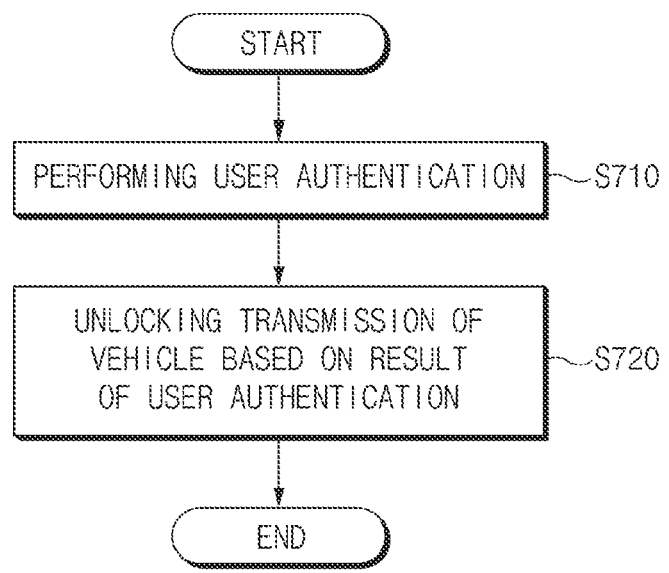
FIG. 7 is a flowchart illustrating a user authentication transmission control method according to an embodiment of the present disclosure.

FIG. 7 is a flowchart illustrating a user authentication transmission control method according to an embodiment of the present disclosure.

Referring to FIG. 7, a user authentication transmission control method may include performing the user authentication (S710) and unlocking the transmission of the vehicle based on the result of the user authentication.

Although not shown, the user authentication transmission control method may further include detecting the key of the vehicle, determining whether the user has departed the vehicle based on at least one of the gear stage of the transmission, whether the vehicle is determined to be in the stopped state, whether the door of the driver's seat of the vehicle is opened or closed, and/or the result of detecting the key, and controlling the transmission to be in the locked state based on whether the user has departed the vehicle.

As an example, the detecting of the key of the vehicle may include detecting the key of the vehicle when the door is opened and then closed in the state in which the gear stage is the P-stage and the vehicle is determined to be stopped.

As an example, the controlling of the transmission to be in the locked state based on whether the user has departed may include determining that the user has departed the vehicle when the key is not detected inside the vehicle to control the transmission to be in the locked state.

Although not shown, the user authentication transmission control method may further include outputting an alarm when manipulation of the transmission in the locked state is attempted in a state in which the user authentication is not completed.

As an example, the unlocking of the transmission of the vehicle based on the result of the user authentication may include unlocking the transmission of the vehicle based on the result of the user authentication including at least one of the face authentication, the iris authentication, and/or the fingerprint authentication.

As an example, the user authentication transmission control method may further include controlling to maintain the EV ready state in which the travel of the vehicle is possible even when the key of the vehicle is not detected inside the vehicle when it is determined that the user has departed the vehicle and the user authentication is completed within the predetermined time.

As an example, the detecting of the key of the vehicle may include detecting the key including the digital key or the card key when information indicating that the user has called the chauffeur service is obtained through a communication terminal.

As an example, the controlling of the transmission to be in the locked state based on whether the user has departed may include controlling the transmission to be in the locked state when the digital key or the card key is not detected inside the vehicle within the predetermined time.

As an example, the user authentication transmission control method may further include deleting the condition in which the key of the vehicle is not detected inside the vehicle from the specific condition of terminating the EV ready state, the travelable state of the vehicle, in response to the call of the chauffeur service.

The description above is merely illustrative of embodiments of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the user authentication transmission according to embodiments of the present disclosure will be described as follows.

According to at least one of the embodiments of the present disclosure, the device and the method for controlling the user authentication transmission that control the transmission of the vehicle to be in the locked state based on the departure of the user and unlock the transmission of the vehicle through the user authentication information determined based on at least one of the face, the iris, and/or the fingerprint of the user to enhance the security of the vehicle may be provided.

Further, according to at least one of the embodiments of the present disclosure, the device and the method for controlling the user authentication transmission that enhance the security of the vehicle by controlling the transmission to be locked or unlocked to be suitable for the situation in consideration of theft occurred situation, the valet parking situation, and the chauffeur service situation may be provided.

Further, according to at least one of the embodiments of the present disclosure, the device and the method for controlling the user authentication transmission that may prevent theft situation by outputting the alarm when the manipulation of the transmission in the locked state is attempted may be provided.

In addition, various effects that are directly or indirectly identified through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a user authentication transmission, the device comprising:
 a user authentication device configured to perform user authentication of a user authorized to operate a vehicle; and
 a controller disposed in the vehicle, wherein the controller is configured to:
  determine an anti-theft situation when a key is not detected inside the vehicle and the user authentication is not performed;

determine a valet parking situation when the key is not detected inside the vehicle and the user authentication is completed within a predetermined time;

determine a surrogate driving situation when a digital key or a card key is detected inside the vehicle is identified after a chauffeur service is called; and determine whether to unlock a transmission of the vehicle based on a result of the user authentication and the determined situation.

2. The device of claim 1, wherein the controller is configured to:

determine whether the user has departed the vehicle; and control the transmission to be in a locked state based on departure of the user.

3. The device of claim 2, wherein:

the user authentication device is configured to perform the user authentication when the controller determines that the user has departed the vehicle; and the controller is configured to unlock the transmission when the user authentication is completed.

4. The device of claim 1, wherein the controller is configured to output an alarm when manipulation of the transmission in a locked state is attempted in a state in which the user authentication is not completed.

5. The device of claim 1, wherein the user authentication includes at least one of face authentication, iris authentication, or fingerprint authentication.

6. A device for controlling a user authentication transmission, the device comprising:

a user authentication device configured to perform user authentication of a user authorized to operate a vehicle;

a key detection device disposed in the vehicle, wherein the key detection device is configured to detect a key of the vehicle; and a controller disposed in the vehicle, wherein the controller is configured to:

determine whether the user has departed the vehicle based on at least one of a gear stage of the transmission, whether the vehicle is determined to be in a stopped state, whether a door of a driver's seat of the vehicle is opened or closed, or a result of detecting the key;

control the transmission to be in a locked state based on departure of the user; and determine whether to unlock a transmission of the vehicle based on a result of the user authentication and a situation;

wherein the situation is an anti-theft situation when the key is not detected inside the vehicle and the user authentication is not performed;

wherein the situation is a valet parking situation when the key is not detected inside the vehicle and the user authentication is completed within a predetermined time; and wherein the situation is a surrogate driving situation when the detection of a digital key or a card key is identified after a chauffeur service is called.

7. The device of claim 6, wherein the controller is configured to:

detect the key through the key detection device when the door is opened and then closed in a state in which the gear stage of the transmission is a P-stage and the vehicle is determined to be in the stopped state; and determine that the user has departed the vehicle when the key is not detected inside the vehicle to control the transmission to be in the locked state.

8. The device of claim 6, wherein the vehicle has a motor driven through electricity, and wherein the controller is configured to control to maintain an electric vehicle (EV) ready state in which travel of the vehicle is possible even when the key of the vehicle is not detected inside the vehicle when it is determined that the user has departed the vehicle and the user authentication is completed through the user authentication device within the predetermined time.

9. The device of claim 6, wherein the controller is configured to control the transmission to be in the locked state when the digital key or the card key is not detected inside the vehicle through the key detection device within the predetermined time when information indicating that the user has called the chauffeur service is obtained through a communication terminal of the user.

10. The device of claim 6, wherein the vehicle has a motor driven through electricity, wherein the controller is configured to determine whether to terminate an electric vehicle (EV) ready state based on a plurality of specific conditions, and wherein the key of the vehicle not being detected inside the vehicle is not one of the specific conditions when the situation is the surrogate driving situation.

11. A method for controlling a user authentication transmission, the method comprising:

performing user authentication of a user authorized to operate a vehicle; and determining whether to unlock a transmission of the vehicle based on a result of the user authentication, wherein determining whether to unlock the transmission comprises determining one of an anti-theft situation, a valet parking situation, and a surrogate driving situation; and unlocking the transmission of the vehicle based on a result of determining whether to unlock the transmission;

wherein the anti-theft situation is determined when a key is not detected inside the vehicle and the user authentication is not performed;

wherein the valet parking situation is determined when the key is not detected inside the vehicle and the user authentication is completed within a predetermined time; and wherein the surrogate driving situation is determined when a digital key or a card key is detected inside the vehicle is identified after a chauffeur service is called.

12. The method of claim 11, further comprising:

determining whether the user has departed the vehicle; and controlling the transmission to be in a locked state based on departure of the user.

13. The method of claim 12, wherein determining whether the user has departed the vehicle comprises determining whether the user has departed the vehicle based on at least one of a gear stage of the transmission, whether the vehicle is determined to be in a stopped state, whether a door of a driver's seat of the vehicle is opened or closed, or a result of detecting the key.

14. The method of claim 13, wherein:

detecting the key of the vehicle includes detecting the key when the door is opened and then closed in a state in which the gear stage of the transmission is a P-stage and the vehicle is determined to be in the stopped state; and controlling the transmission to be in the locked state based on the departure of the user includes determining that the user has departed the vehicle when the key is not detected inside the vehicle to control the transmission to be in the locked state.

15. The method of claim 13, wherein the vehicle has a motor driven through electricity, and wherein the method further includes controlling to maintain an electric vehicle (EV) ready state in which travel of the vehicle is possible even when the key of the vehicle is not detected inside the vehicle when it is determined that the user has departed the vehicle and the user authentication is completed within the predetermined time.

16. The method of claim 13, wherein:
the method further comprises detecting the key of the vehicle by detecting the digital key or the card key when information indicating that the user has called the chauffeur service is obtained through a communication terminal of the user; and
controlling the transmission to be in the locked state based on the departure of the user comprise controlling the transmission to be in the locked state when the digital key or the card key is not detected inside the vehicle within the predetermined time.

17. The method of claim 13, wherein the vehicle has a motor driven through electricity, and wherein the method further includes determining whether to terminate an electric vehicle (EV) ready state of the vehicle based on a plurality of specific conditions, and wherein the key of the vehicle not being detected inside the vehicle is not one of the specific conditions when the situation is the surrogate driving situation.

18. The method of claim 12, wherein:
performing the user authentication includes performing the user authentication when it is determined that the user has departed the vehicle; and
unlocking the transmission of the vehicle based on the result of the user authentication includes unlocking the transmission when the user authentication is completed.

19. The method of claim 11, further comprising outputting an alarm when manipulation of the transmission in a locked state is attempted in a state in which the user authentication is not completed.

20. The method of claim 11, wherein the user authentication includes at least one of face authentication, iris authentication, or fingerprint authentication.

* * * * *